United States Patent [19]
Beyer

[11] Patent Number: 5,826,939
[45] Date of Patent: Oct. 27, 1998

[54] METHOD AND APPARATUS FOR ATTACHING A TRIM COVER TO A SEAT FRAME

[75] Inventor: Michael T. Beyer, Walled Lake, Mich.

[73] Assignee: Lear Corporation, Southfield, Mich.

[21] Appl. No.: 910,725

[22] Filed: Aug. 13, 1997

[51] Int. Cl.⁶ ................................................. A47C 27/00
[52] U.S. Cl. .................................. 297/218.3; 297/218.1; 24/369
[58] Field of Search .......................... 297/452.59, 228.13, 297/219.1, 218.3, 218.5, 463.1, 218.1, 218.2; 24/600.9, 369, 371, 768, 265 C; 5/402

[56] References Cited

U.S. PATENT DOCUMENTS

| | | |
|---|---|---|
| 3,196,511 | 7/1965 | Kintner . |
| 3,216,029 | 11/1965 | Fritzmeier . |
| 3,235,926 | 2/1966 | Mates . |
| 3,273,178 | 9/1966 | Baruth et al. . |
| 3,453,696 | 7/1969 | Mates . |
| 3,928,898 | 12/1975 | Smoot . |
| 3,981,534 | 9/1976 | Wilton . |
| 4,140,253 | 2/1979 | Vickers et al. . |
| 4,403,366 | 9/1983 | Lucke . |
| 4,706,914 | 11/1987 | Ground . |
| 4,789,201 | 12/1988 | Selbert . |
| 4,861,104 | 8/1989 | Malak . |
| 5,011,210 | 4/1991 | Inone . |
| 5,236,243 | 8/1993 | Reyes . |
| 5,338,092 | 8/1994 | Wiltsey et al. . |
| 5,382,083 | 1/1995 | Fecteau et al. . |
| 5,401,075 | 3/1995 | Venuto et al. . |
| 5,478,134 | 12/1995 | Bernard et al. . |
| 5,560,677 | 10/1996 | Cykana et al. . |
| 5,658,046 | 8/1997 | Rus . |
| 5,718,478 | 2/1998 | Allison . |

*Primary Examiner*—Milton Nelson, Jr.
*Attorney, Agent, or Firm*—Brooks & Kushman P.C.

[57] ABSTRACT

An apparatus for attaching a trim cover to an attachment feature in a vehicle includes a retainer having first and second co-extruded portions. The first portion is adapted for attachment to the trim cover, and the second portion is adapted to engage the attachment feature. The first portion includes a relatively flexible material to facilitate flexing for attachment. The second portion includes a relatively rigid material to facilitate rigid engagement with the attachment feature. A method for attaching a trim cover to an attachment feature in a vehicle is also described.

6 Claims, 2 Drawing Sheets

METHOD AND APPARATUS FOR ATTACHING A TRIM COVER TO A SEAT FRAME

TECHNICAL FIELD

The present invention relates to a method and apparatus for attaching a trim cover to a seat frame, and more particularly to a dual durometer J-retainer adapted for attachment to the trim cover and for engagement with the seat frame.

BACKGROUND OF THE INVENTION

Referring to FIG. 1, a typical prior art seat assembly 10 is shown. The seat assembly 10 comprises a seat cushion 12 supported on a seat frame 14. The cushion 12 is covered by a trim cover 16. The trim cover 16 includes first and second portions 18,20 which are secured together within a channel 22 formed in the cushion 12 for forming a crease on top of the seat assembly 10. The second portion 20 of the trim cover 16 is wrapped around the seat frame 14 for attachment beneath the seat frame 14.

In order to accomplish such attachment, an extender 24, such as Typar™, which is a reinforced paper-based material, is sewn along the edge 26 of the trim cover 16. A J-strip 28 is then sewn to the opposite end of the extender 24 to facilitate attachment to the seat frame 14. For example, the J-strip 28 may be snapped onto the frame edge 30 for such attachment. However, the J-strip 20 is typically secured to any of a number of seat frame components, such as frame edges or frame support wires. Because the trim cover material 26 is generally very expensive, it is desirable to use such an extender 24 for enabling attachment of the J-strip beneath the seat frame 14. The material used for the extender 24 is relatively inexpensive in comparison to the trim cover material 16.

However, use of the extender material 24 requires sewing of the extender material 24 to the trim cover edge 26, and also sewing the extender 24 to the J-strip 28. Also, extra handling is required because the extender 24 and J-strip 28 comprise separate components.

Accordingly, it is desirable to provide a method of attaching a trim cover edge to a seat frame in a manner in which manufacturing costs and scrap rates are reduced.

DISCLOSURE OF THE INVENTION

The present invention provides a method and apparatus for attaching a trim cover edge to a seat frame in which a pair of materials are co-extruded to form an elongated dual durometer J-strip adapted for attachment to both the trim cover edge and the seat frame. A flexible material is used for attachment to the trim cover edge, and a relatively more rigid material is used to form a hook for attachment to the seat frame. Accordingly, the fragile, paper-based extender of the prior art is eliminated, and only a single sewing step is required.

More specifically, the present invention provides an apparatus for attaching a trim cover to an attachment feature in a vehicle, comprising a retainer which includes first and second co-extruded portions. The first portion is adapted for attachment to the trim cover, and the second portion is adapted to engage the attachment feature. The first portion comprises a relatively flexible material to facilitate flexing for attachment, and the second portion comprises a relatively rigid material to facilitate engagement with the attachment feature.

Another aspect of the invention provides a method of securing a trim cover to a vehicle seat frame, including: a) co-extruding first and second moldable materials to form a J-retainer having a first relatively flexible portion adapted for attachment to the trim cover and a second relatively rigid portion with a substantially J-shaped cross-section for attachment to the seat frame; b) sewing the first portion to the trim cover; and c) attaching the second portion to the seat frame.

Accordingly, an object of the present invention is to provide a method and apparatus for securing a trim cover to a vehicle seat frame in which trim cover material usage is minimized, and in which an extension is provided which is not subject to tearing.

Another object of the present invention is to provide a method and apparatus for securing a trim cover to an attachment feature in a vehicle in which manufacturing costs, assembly costs, and scrap rate are reduced.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
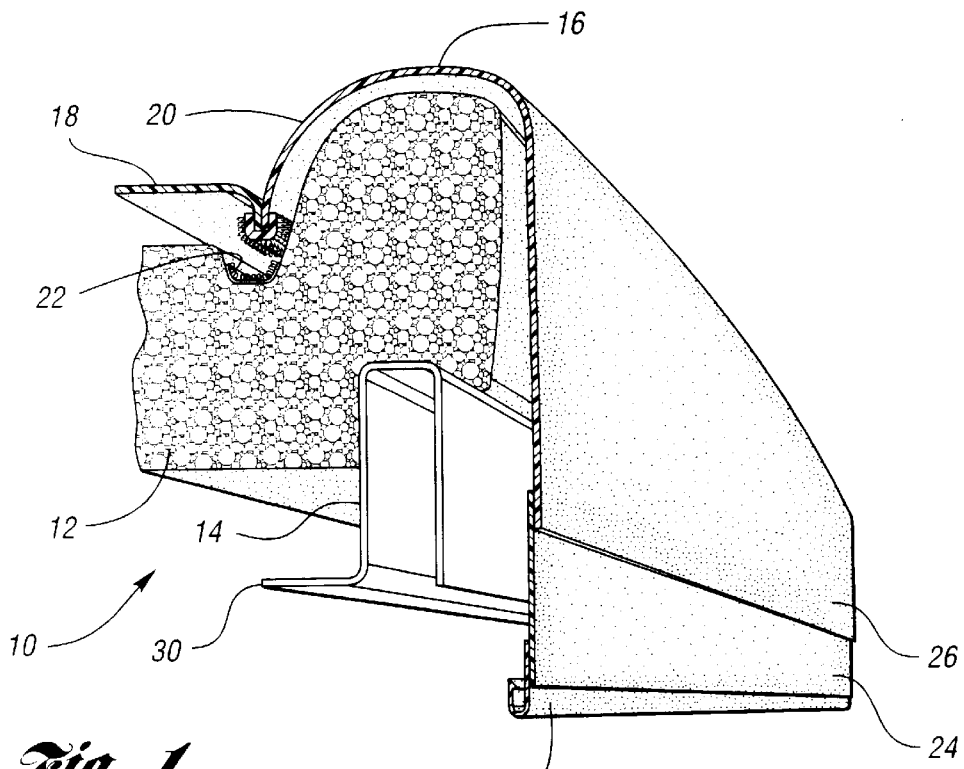
FIG. 1 shows a schematically arranged cutaway perspective view of a prior art seat assembly.
Figure 2:
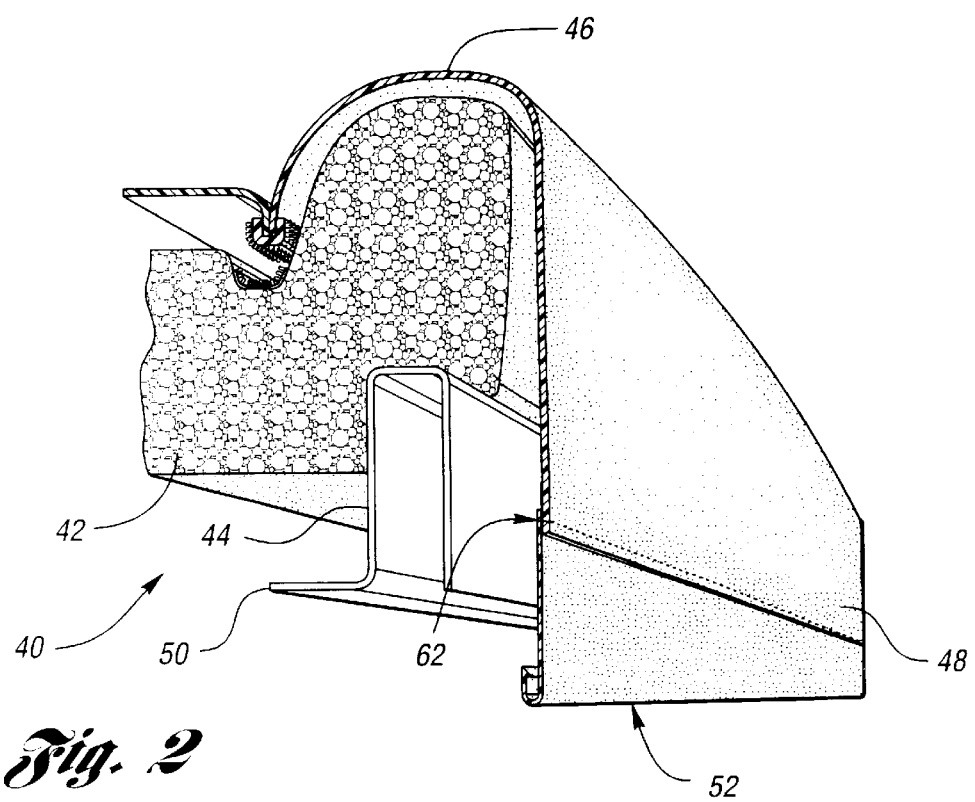
FIG. 2 shows a schematically arranged cutaway perspective view of a seat assembly in accordance with the present invention.

Referring to FIG. 2, a seat assembly 40 is shown in accordance with the present invention. The seat assembly 40 includes a cushion 42 supported on a seat frame 44, and covered by a trim cover 46. The trim cover edge 48 is secured to the seat frame edge 50 by means of the dual durometer J-retainer 52.

Figure 4:
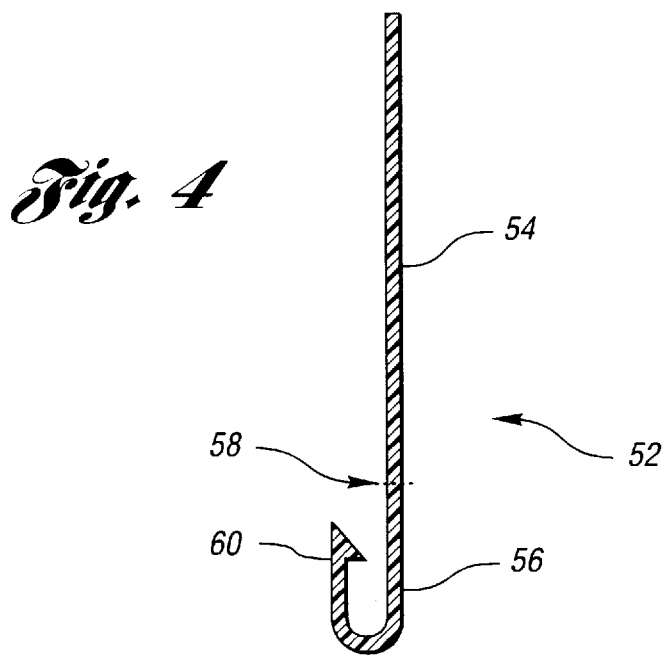
FIG. 4 shows a cross-sectional view of a dual durometer J-retainer in accordance with the present invention.

The dual durometer J-retainer 52, as shown in FIG. 4, comprises first and second co-extruded portions 54,56, respectively. The first portion 54 is adapted for attachment to the trim cover edge 48, and the second portion 56 is adapted to engage the seat frame edge 50, which acts as an attachment feature. The first portion 54 comprises a relatively flexible material to facilitate flexing for attachment. The second portion 56 comprises a relatively rigid material to facilitate rigid engagement with the seat frame edge 50. For example, the first and second portions 54,56 may comprise polyethylenes or polypropylenes of different durometer. In a preferred embodiment, the first and second portions 54,56 are flexible and rigid PVC, respectively. Alternatively, the first portion 54 could comprise Geon 83794, manufactured by B.F. Goodrich Corporation, and the second portion 56 could comprise any compatible material.

The first and second portions 54,56 cooperate to form a continuous, substantially uniform cross-sectional thickness at the interface 58 therebetween. The second portion 56 comprises a substantially J-shaped cross-section with a hook 60 formed at a distal end thereof for engagement with the seat frame edge 50.

As shown in FIG. 2, the J-retainer 52 is secured to the trim cover edge 48 at the sew line 62. Because the first portion 54 is a flexible, rubbery polyethylene, the risk of tearing is significantly reduced in comparison to the prior art paper-based materials.

Figure 3:
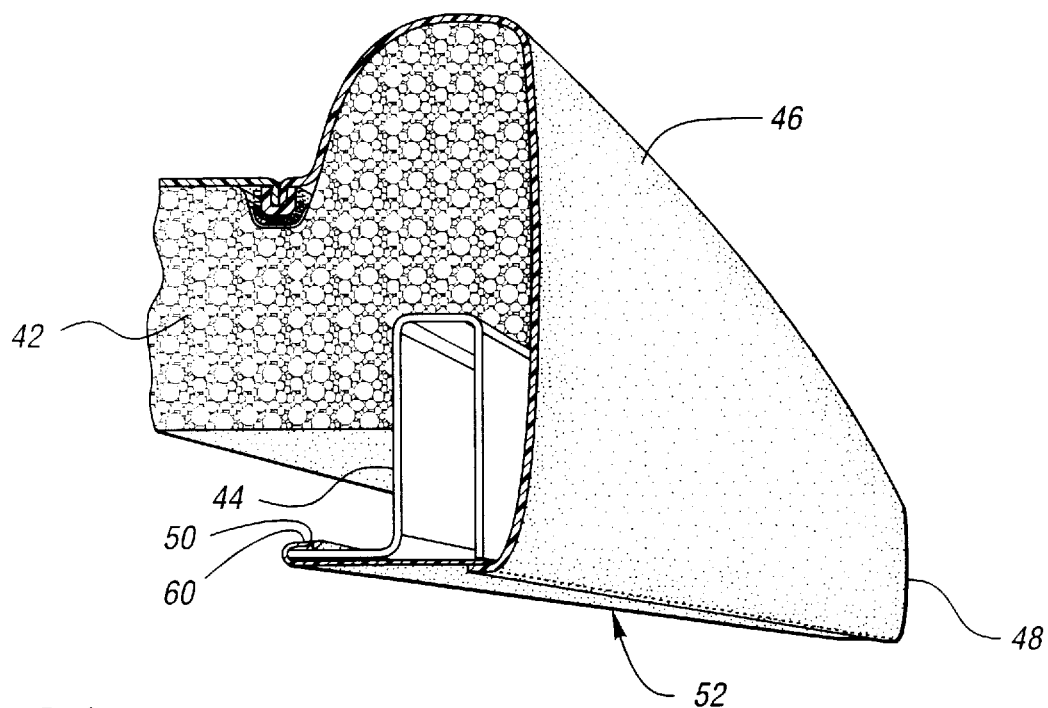
FIG. 3 shows a schematically arranged cutaway perspective view of the seat assembly of FIG. 2 with the trim cover attached to the seat frame.

Turning to FIG. 3, the J-retainer 52 is shown in a position in which the hook portion 60 is engaged with the seat frame edge 50 for attachment of the trim cover 46 to the seat frame 44. With the trim cover edge 48 partially wrapped around the seat frame 44 no rough edge is exposed.

Co-extrusion of the first and second portions 54,56 of the J-retainer 52 is a relatively inexpensive process, so the J-retainer 52 may be used as an extension to reduce the trim cover material requirement, thereby reducing manufacturing costs. Also, because the J-retainer 52 only requires a single sewing operation for attachment to the trim cover edge 48, assembly costs are reduced.

A method of securing a trim cover to a vehicle seat frame in accordance with the present invention comprises: a) co-extruding first and second moldable materials to form a J-retainer having a first relatively flexible portion adapted for attachment to the trim cover and a second relatively rigid portion with a substantially J-shaped cross-section for attachment to the seat frame; b) sewing the first portion to the trim cover; and c) attaching the second portion to the seat frame.

While the best mode for carrying out the invention has been described in detail, those familiar with the art to which this invention relates will recognize various alternative designs and embodiments for practicing the invention within the scope of the appended claims.

What is claimed is:

1. An apparatus for attaching a trim cover to an attachment feature in a vehicle, comprising:

a retainer having first and second co-extruded portions, said first portion being adapted for attachment to the trim cover and said second portion being adapted to engage the attachment feature;

wherein said first portion comprises a relatively flexible material to facilitate flexing for attachment;

wherein said second portion comprises a relatively rigid material to facilitate rigid engagement with the attachment feature; and wherein said second portion comprises a substantially J-shaped cross-section with a hook portion configured for engagement with the attachment feature.

2. The apparatus of claim 1, wherein said first and second portions cooperate to form a continuous, substantially uniform cross-sectional thickness at an interface therebetween.

3. The apparatus of claim 1, wherein said first and second portions comprise polyethylenes of different durometer.

4. An apparatus for attaching a trim cover to an attachment feature in a vehicle, comprising:

a retainer having first and second co-extruded portions, said first portion being adapted for attachment to the trim cover and said second portion being adapted to engage the attachment feature;

wherein the first portion comprises a relatively flexible material to facilitate flexing for attachment;

wherein the second portion comprises a relatively rigid material to facilitate engagement with the attachment feature; and wherein the first and second portions cooperate to form a continuous, substantially uniform cross-sectional thickness at an interface therebetween.

5. The apparatus of claim 4, wherein said first and second portions comprise polyethylenes of different durometer.

6. The apparatus of claim 4, wherein said second portion comprises a substantially J-shaped cross-section with a hook formed at a distal end thereof for engagement with the attachment feature.

* * * * *